(12) United States Patent
Dean et al.

(10) Patent No.: US 8,407,239 B2
(45) Date of Patent: Mar. 26, 2013

(54) MULTI-STAGE QUERY PROCESSING SYSTEM AND METHOD FOR USE WITH TOKENSPACE REPOSITORY

(75) Inventors: Jeffrey Adgate Dean, Palo Alto, CA (US); Paul G. Haahr, San Francisco, CA (US); Olcan Sercinoglu, Mountain View, CA (US); Amitabh K. Singhal, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1915 days.

(21) Appl. No.: 10/917,746

(22) Filed: Aug. 13, 2004

(65) Prior Publication Data

US 2006/0036593 A1    Feb. 16, 2006

(51) Int. Cl.
G06F 7/00     (2006.01)
G06F 17/30    (2006.01)

(52) U.S. Cl. .......................... 707/764; 707/767; 707/768

(58) Field of Classification Search .................. 707/100, 707/764, 767, 768
See application file for complete search history.

(56) References Cited

U.S. PATENT DOCUMENTS

| | | | |
|---|---|---|---|
| 5,374,928 A | 12/1994 | Moore et al. | |
| 5,488,364 A | 1/1996 | Cole | |
| 5,548,751 A | 8/1996 | Ryu et al. | |
| 5,758,360 A | 5/1998 | Zbikowski et al. | |
| 5,812,999 A * | 9/1998 | Tateno | 707/3 |
| 5,848,407 A * | 12/1998 | Ishikawa et al. | 707/2 |
| 5,855,015 A * | 12/1998 | Shoham | 707/5 |
| 5,946,716 A | 8/1999 | Karp et al. | |
| 5,987,457 A * | 11/1999 | Ballard | 707/5 |
| 5,991,713 A | 11/1999 | Unger et al. | 704/9 |
| 6,055,526 A * | 4/2000 | Ambroziak | 707/2 |
| 6,076,051 A * | 6/2000 | Messerly et al. | 704/9 |
| 6,154,737 A | 11/2000 | Inaba et al. | |

(Continued)

FOREIGN PATENT DOCUMENTS

| | | |
|---|---|---|
| EP | 0584992 A2 | 3/1994 |
| JP | 06-208453 | 7/1994 |
| JP | 09-218881 | 8/1997 |
| JP | 2000-137730 | 5/2000 |

(Continued)

OTHER PUBLICATIONS

Sheng, X., et al., "An Information Retrieval System Based on Automatic Query Expansion and Hopfield Network," IEEE Int'l Conf. Neural Networks & Signal Processing, Nanjing, China, Dec. 14-17, 2003.

(Continued)

*Primary Examiner* — Mariela Reyes
(74) *Attorney, Agent, or Firm* — Morgan, Lewis & Bockius LLP

(57) ABSTRACT

A multi-stage query processing system and method enables multi-stage query scoring, including "snippet" generation, through incremental document reconstruction facilitated by a multi-tiered mapping scheme. At one or more stages of a multi-stage query processing system a set of relevancy scores are used to select a subset of documents for presentation as an ordered list to a user. The set of relevancy scores can be derived in part from one or more sets of relevancy scores determined in prior stages of the multi-stage query processing system. In some embodiments, the multi-stage query processing system is capable of executing one or more passes on a user query, and using information from each pass to expand the user query for use in a subsequent pass to improve the relevancy of documents in the ordered list.

18 Claims, 10 Drawing Sheets

U.S. PATENT DOCUMENTS

| | | | |
|---|---|---|---|
| 6,233,575 B1 | 5/2001 | Agrawal et al. | |
| 6,353,825 B1 * | 3/2002 | Ponte | 707/5 |
| 6,388,585 B1 | 5/2002 | Lacerda | |
| 6,553,457 B1 | 4/2003 | Wilkins et al. | |
| 6,631,373 B1 | 10/2003 | Otani et al. | |
| 6,646,577 B2 | 11/2003 | Acharya et al. | |
| 6,728,722 B1 | 4/2004 | Shaylor | |
| 6,832,294 B2 | 12/2004 | Wicki et al. | |
| 7,092,936 B1 | 8/2006 | Alonso et al. | |
| 2001/0049679 A1 * | 12/2001 | Yonaitis | 707/4 |
| 2002/0091671 A1 | 7/2002 | Prokoph | |
| 2002/0101367 A1 | 8/2002 | Geiger et al. | |
| 2003/0204500 A1 * | 10/2003 | Delpech | 707/3 |
| 2004/0044622 A1 | 3/2004 | Blott et al. | |
| 2004/0051896 A1 | 3/2004 | Saitoh et al. | |
| 2004/0158560 A1 | 8/2004 | Wen et al. | 707/4 |
| 2004/0225497 A1 | 11/2004 | Callahan | |
| 2005/0210009 A1 * | 9/2005 | Tran | 707/3 |

FOREIGN PATENT DOCUMENTS

| | | |
|---|---|---|
| JP | 2003-242170 A | 8/2003 |
| KR | 10-0295354 | 9/2001 |

OTHER PUBLICATIONS

Search Report for International Application No. PCT/US2005/028192, dated Jan. 16, 2006.

Fukushima, Basic technologies and trends of Web search engines, Part 1, Basic technologies, pp. 363-372.

Google Inc., International Search Report and Written Opinion, PCT/US2005/028192, Jan. 16, 2006, 11 pgs.

Google Inc., Office Action, Chinese Patent Application No. 200580034128.9, Dec. 5, 2008, 3 pgs.

Google Inc., Office Action, Chinese Patent Application No. 200580034128.9, Jun. 8, 2010, 4 pgs.

Google Inc., Office Action, Chinese Patent Application No. 200580034128.9, Apr. 25, 2008, 8 pgs.

Google inc., Office Action, Chinese Patent Application No. 201010144526.9, Jan. 27, 2011, 6 pgs.

Google Inc., Office Action, Chinese Patent Application No. 201110121210.2, Nov. 16, 2011, 6 pgs.

Google Inc., Office Action, European Patent Application No. 05784308.8, May 10, 2012, 7 pgs.

Google Inc., Office Action, European Patent Application No. 05784308.8, Aug. 12, 2010, 7 pgs.

Google Inc., Office Action, Japanese Patent Application No. 2007-525718, Nov. 10, 2010, 6 pgs.

Google Inc., Office Action, Korean Patent Application No. 2007-7005777, Jul. 25, 2011, 3 pgs.

* cited by examiner

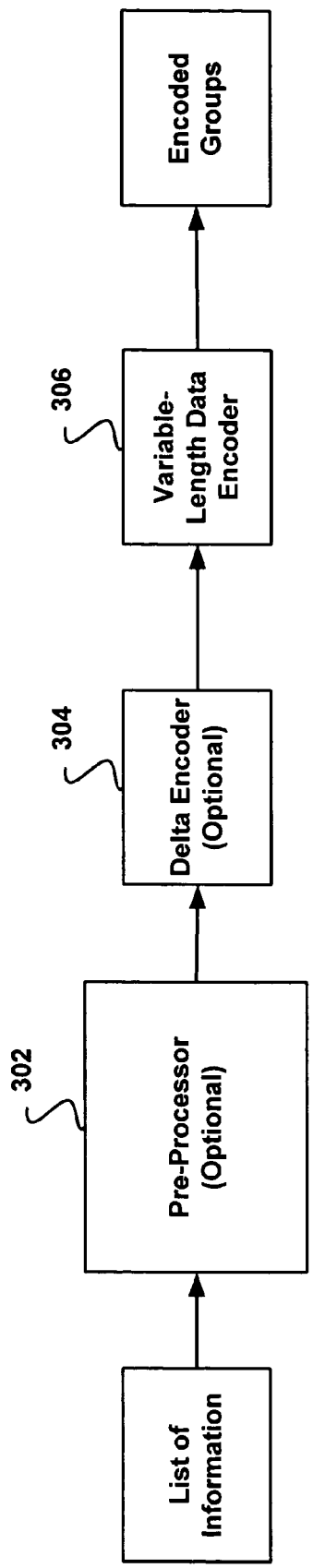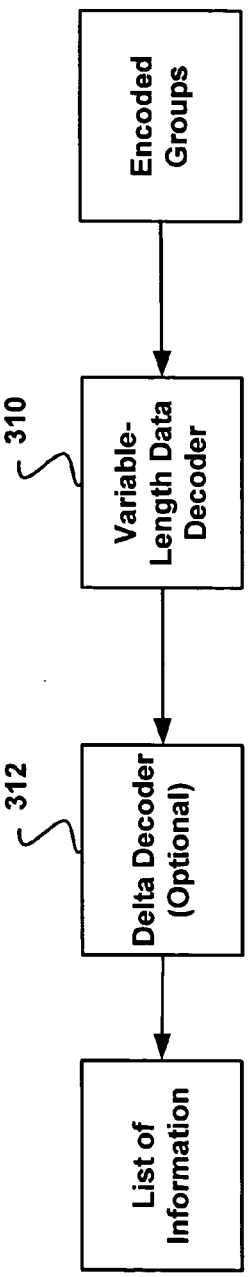
*Figure 3A*
*Figure 3B*

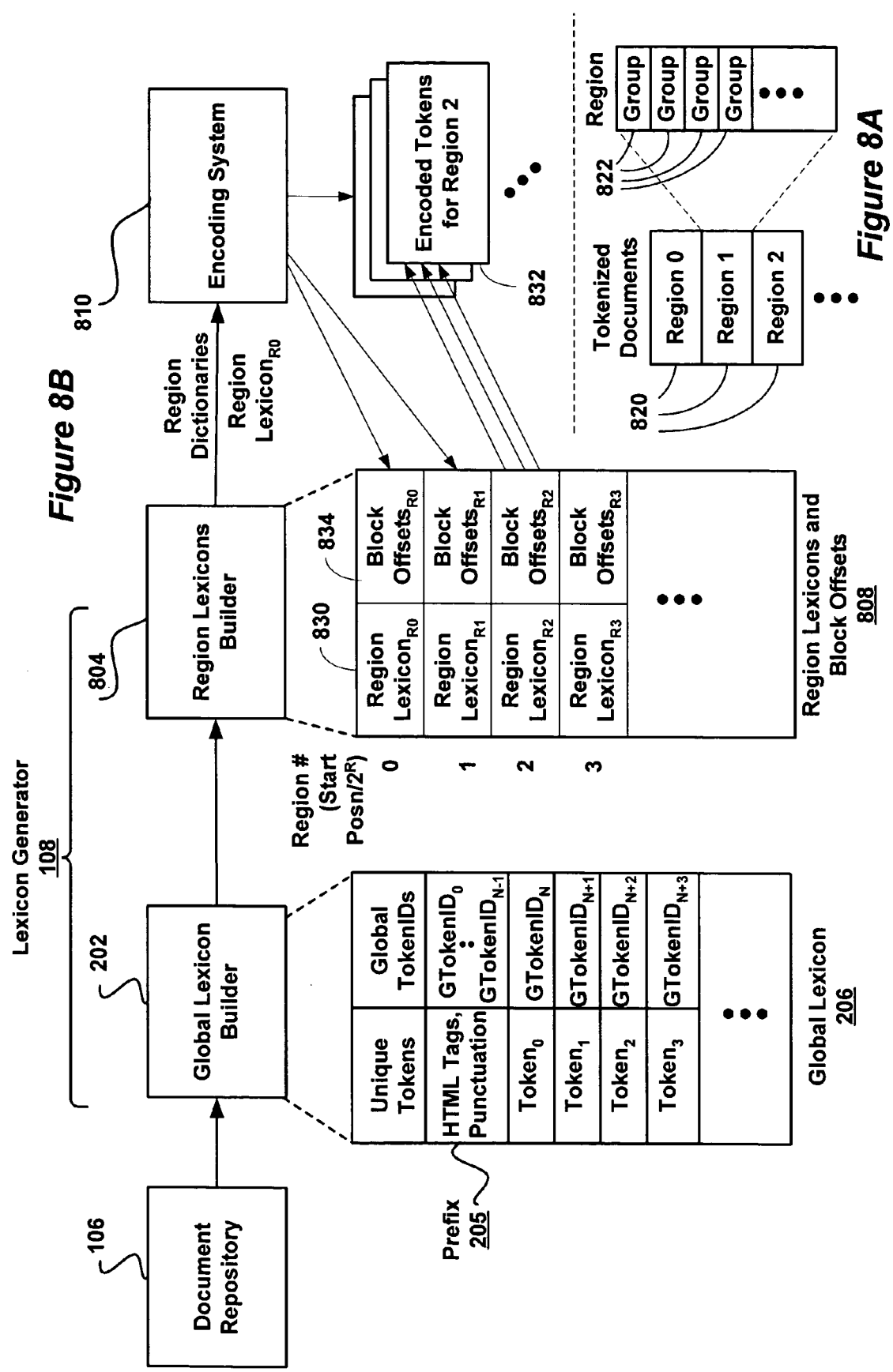

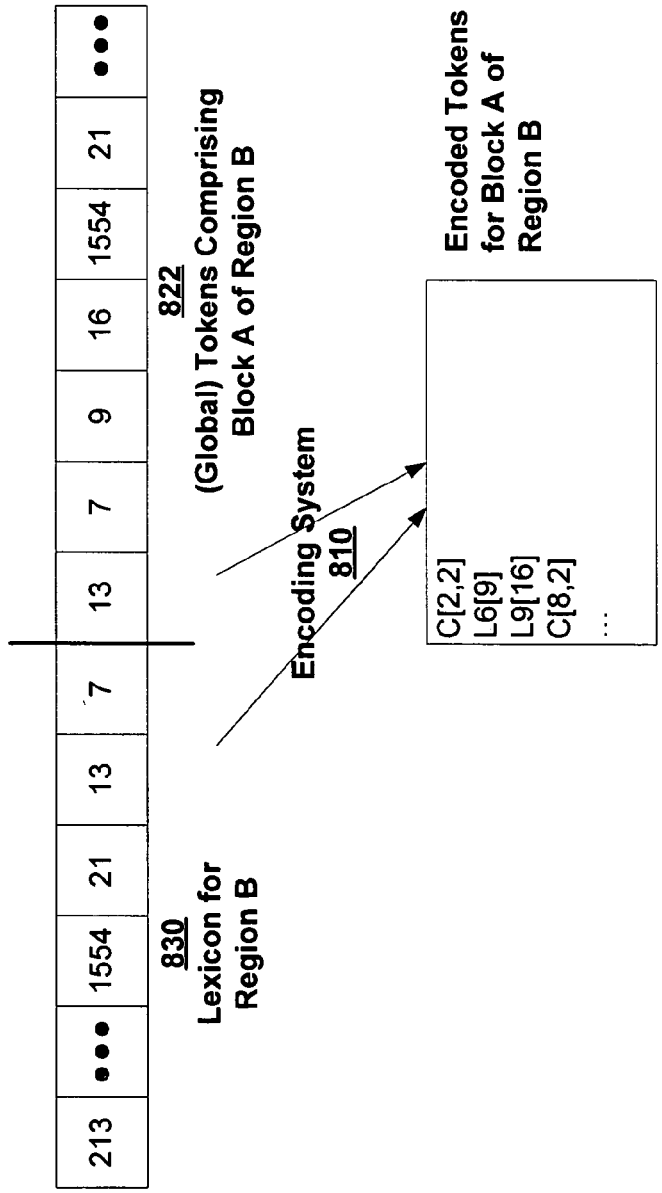
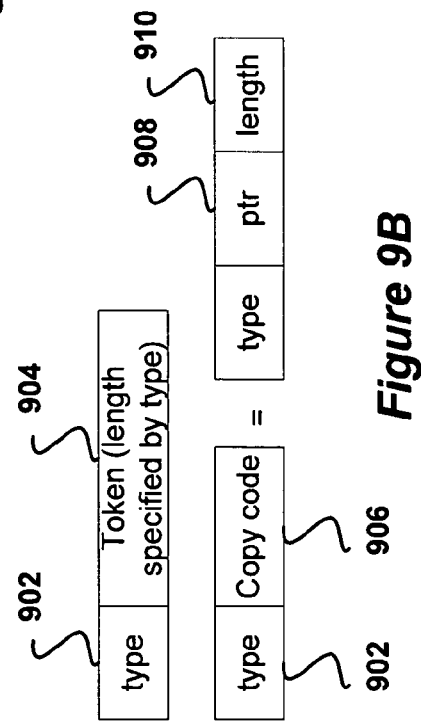
*Figure 9A*
*Figure 9B*

US 8,407,239 B2

MULTI-STAGE QUERY PROCESSING SYSTEM AND METHOD FOR USE WITH TOKENSPACE REPOSITORY

RELATED APPLICATIONS

This application is related to U.S. patent application Ser. No. 10/917,745, filed Aug. 13, 2004, entitled "System and Method for Encoding and Decoding Variable-Length Data," and U.S. patent application Ser. No. 10/917,739, filed Aug. 13, 2004, entitled "Document Compression System and Method For Use With Tokenspace Repository," which applications are incorporated by reference herein in their entirety.

TECHNICAL FIELD

The disclosed embodiments relate generally to data processing systems and methods, and in particular to a multi-stage query processing system and method for use with a collection of documents with an associated index (hereinafter also referred to as a "tokenpace repository").

BACKGROUND

Information retrieval systems (e.g., search engines), match queries against an index of documents generated from a document corpus (e.g., the World Wide Web). A typical inverse index includes the words in each document, together with pointers to their locations within the documents. A document processing system prepares the inverted index by processing the contents of the documents, pages or sites retrieved from the document corpus using an automated or manual process. The document processing system may also store the contents of the documents, or portions of the content, in a repository for use by a query processor when responding to a query.

There is a continuing need for more sophisticated query searching and scoring techniques to ensure that query results are relevant to the query. Some scoring techniques may require a partial reconstruction of the candidate documents, for example to determine the context of query terms or keywords found in the documents. Unfortunately, introducing of such sophisticated techniques can result in a degradation of search performance due to the additional processing and overhead involved.

SUMMARY OF EMBODIMENTS

The disclosed embodiments include a multi-stage query processing system and method for use with a tokenspace repository. The multi-stage query processing system and method enables multi-stage query scoring, including "snippet" generation, through incremental document reconstruction facilitated by a multi-tiered mapping scheme. At one or more stages of a multi-stage query processing system a set of relevancy scores are used to select a subset of documents for presentation as an ordered list to a user. The set of relevancy scores can be derived in part from one or more sets of relevancy scores determined in prior stages of the multi-stage query processing system. In some embodiments, the multi-stage query processing system is capable of executing two or more passes on a user query, and using information from each pass to expand the user query for use in a subsequent pass to improve the relevancy of documents in the ordered list.

BRIEF DESCRIPTION OF THE DRAWINGS

FIG. 3A is a block diagram of an embodiment of an encoding system for encoding documents for a tokenspace repository.

FIG. 3B is a block diagram of an embodiment of a decoding system for decoding documents in a tokenspace repository.

FIG. 8a is a block diagram of a second embodiment of a tokenized document repository, and FIG. 8b is a conceptual block diagram of a second embodiment of the lexicon generator of FIG. 1.

FIG. 9A is a conceptual diagram of an encoding process used in the embodiment of the lexicon generator, and FIG. 9B depicts exemplary data structures for representing encoded tokens.

Like reference numerals refer to corresponding parts throughout the several views of the drawings.

DESCRIPTION OF EMBODIMENTS

System Overview

Figure 1:
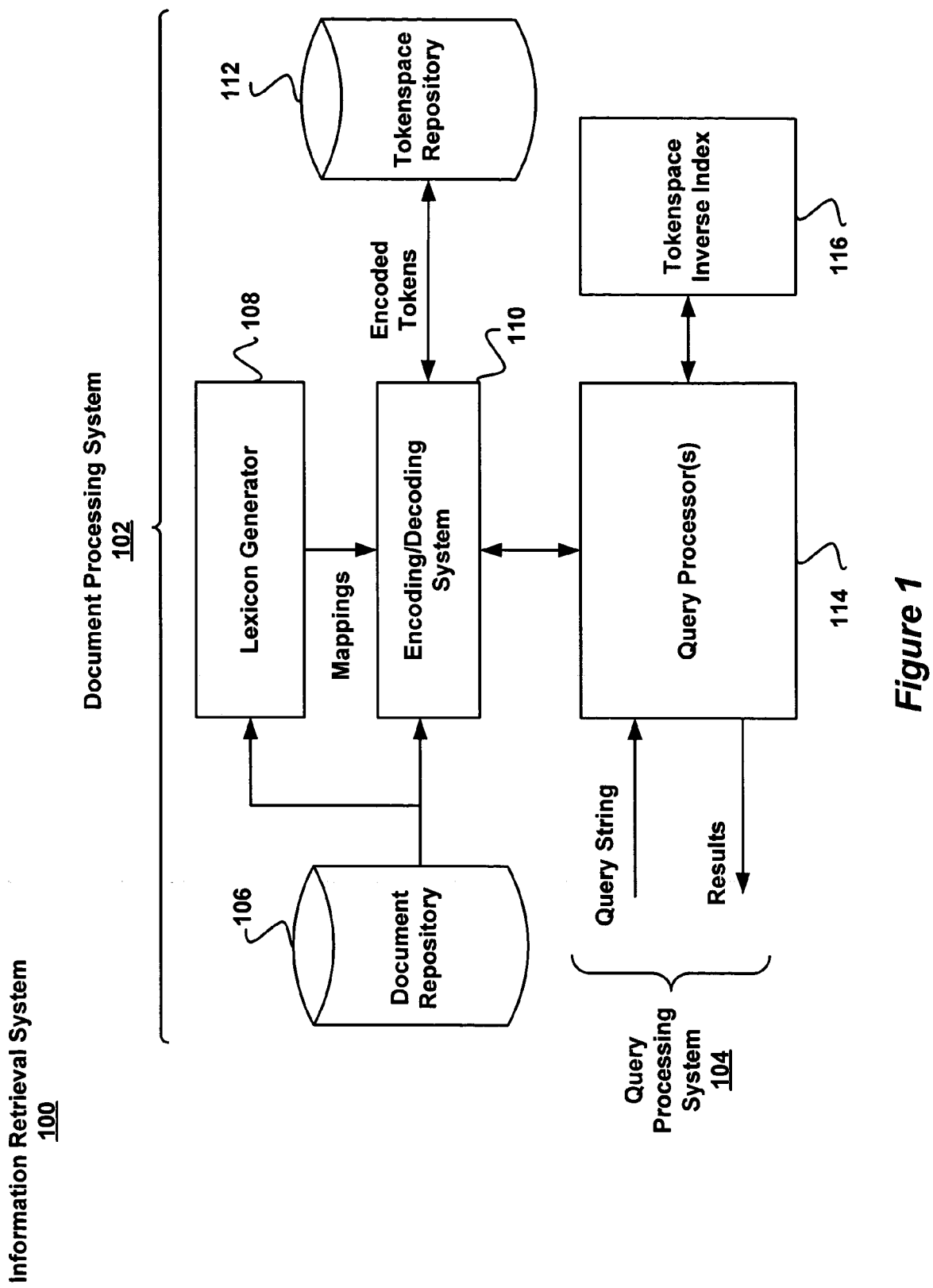
FIG. 1 is a block diagram of an embodiment of a information retrieval system.

FIG. 1 is a block diagram of an embodiment of an information retrieval system 100. The information retrieval system 100 includes a document processing system 102 and a query processing system 104. The information retrieval system 100 can be any system that is capable of retrieving information in response to a query, including but not limited to one or more computer systems for performing expressed or implicit document searches on one or more networks, such as the Internet (e.g., via the World Wide Web) or an intranet, or locally on a user's computer (e.g., of files, email, applications, etc.). Note that the term "documents" means documents, web pages, emails, application specific documents and data structures, Instant Messaging (IM) messages, audio files, video files, and any other data or applications that may reside on one or more computer systems.

Document Processing System

The document processing system 102 generally includes one or more document repositories 106, a lexicon generator 108, an encoding/decoding system 110 and a tokenspace repository 112. The encoding/decoding system 110 retrieves documents from the one or more document repositories 106, parses the documents into tokens, encodes the tokens into a compressed format using mappings from the lexicon generator 108, then stores the encoded tokens in the tokenspace repository 112.

A "token" can be any object typically found in a document, including but not limited to terms, phrases, punctuation, HTML tags and the like. After parsing, a set of documents is represented as a sequence of tokens. Furthermore, each token in the sequence of tokens has a token position, which also represents the position of the token in the set of documents. For example, the first token in the set of documents may be assigned a position of 0, the second token in the set of documents may be assigned a position of 1, and so on.

It is noted that in some implementations, a completely different set of computers are used for encoding documents than the computers used for decoding documents. For instance, a web crawling system may include a document processing system 102 that encodes documents, while a query processing system 104 may decode selected portions of the encoded documents. In such implementations, the document inverse index and tokenspace repository 112 built by the document processing system 102, or copies thereof, are used by the query processing system 104.

The lexicon generator 108 generates the mappings used for encoding a set of documents by parsing the documents. A first mapping produced by the lexicon generator 108 is herein called the global-lexicon, which identifies all distinct tokens (herein called unique tokens) in the set documents, and assigns a global token identifier to each unique token. A second mapping produced by the lexicon generator 108 is actually a sequence of mappings, each of which is herein called a mini-lexicon. Each respective mini-lexicon is used only for encoding and decoding a respective range of positions in the set of documents. The generation and use of the global-lexicon and the mini-lexicons are explained in more detail below.

Query Processing System

The query processing system 104 includes one or more query processors 114 coupled to the encoding/decoding system 110 and a tokenspace inverse index 116. The tokenspace inverse index 116 maps all the GTokenIDs in the set of documents to their positions within the documents. Conceptually, the inverse index 116 contains a list of token positions for each GTokenID. For efficiency, the list of token positions for each GTokenID is encoded so as to reduce the amount of space occupied by the inverse index.

In some embodiments, the one or more query processor(s) 114 parse a query into multiple query terms which are transformed by the one or more query processors 114 into a query expression (e.g., Boolean tree expression). The query terms are used to index the tokenspace inverse index 116 to retrieve token positions, as described more fully with respect to FIG. 4. In some embodiments, the token positions are used in a multi-stage query processing system for scoring documents relevant to the query, as described with respect to FIG. 5. In response to the query terms, the query processors 114 generate an ordered list of documents which are presented to the user via one or more modes of communication (e.g., display device, audio, etc.).

Lexicon Generator

Figure 2:
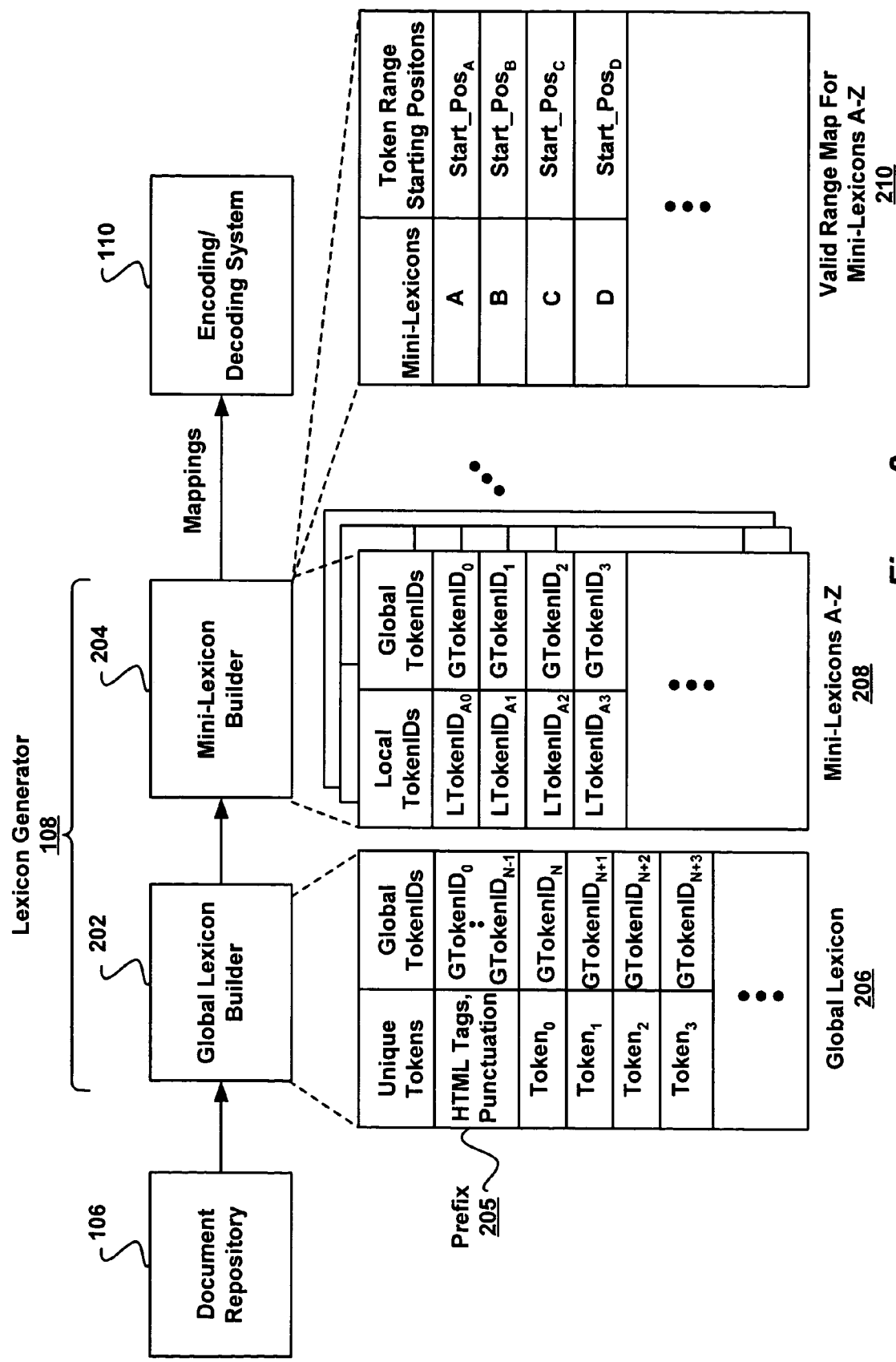
FIG. 2 is a conceptual block diagram of an embodiment of the lexicon generator of FIG. 1.

FIG. 2 is a conceptual block diagram of an embodiment of the lexicon generator 108 of FIG. 1. The lexicon generator 108 includes a global-lexicon builder 202 and a mini-lexicon builder 204.

Global-Lexicon Builder

The global-lexicon builder 202 retrieves documents from the document repository 106 and generates a global-lexicon 206 by assigning unique global token identifiers (GTokenIDs) to each unique token contained in the documents. In some embodiments, the document repository 106 is logically or physically split into multiple portions, sometimes called partitions, and a separate global-lexicon 206 is generated for each partition. In one embodiment, a set of several billion documents is divided into several thousand partitions, each of which is processed to generate a global-lexicon 206. A typical global-lexicon 206 can include a few million unique tokens.

In some embodiments, the set of documents to be encoded (e.g., the documents in one partition) are sorted in accordance with one or more criteria prior to the parsing of the documents into tokens and the processing of the tokens. Such sorting of the documents can facilitate efficient encoding of the tokenized documents, because documents that use similar sets of words will be positioned near each other in the set of documents. As a result, each mini-lexicon (described below) will, on average, cover a larger portion of the set of documents than would otherwise be the case, and more generally, the encoding of the documents will occupy less space. In one embodiment, the set of documents are first sorted by language, and then the documents for each language are sorted by URL, with the fields of the host name portion of the URL being reversed in order. For example, after the sorting by language, all the French documents will be grouped together, and then the French documents will be sorted by URL. When sorting by URL, each URL initially comprises a pattern of h1.h2 . . . hy.hz/n1/n2 . . . , where h1.h2 . . . hy.hz comprises the host name portion of the URL and /n1/n2 represents the remainder of the URL. The URL is remapped to the pattern hz.hy . . . h2.h1/n1/n2 . . . prior to the sorting by URL. For example, the URL "www.google.com/about.html" is remapped to "com.google.www/about.html". By reversing the host name fields of the URLs prior to sorting by URL, the documents are sorted in accordance with their logical proximity to each other. Thus, similar types of documents (within the group of documents for a particular language) are grouped together; within the group of documents for each document type, documents on each web site are grouped together; within the documents for each website, the documents for various branches of the website are grouped together; and so on.

In some embodiments, the documents are ordered using one or more clustering techniques. Terms, words or phrases contained in documents can be used to organize the documents into clusters that relate to various concepts. For example, general information about the documents (e.g., meta-data embedded in or otherwise associated with the identified documents), sampled content from the identified documents, and/or category information about the documents can be used to order the documents.

In some embodiments, while parsing the documents the global lexicon builder 202 stores information (not shown in FIG. 2) about each identified unique token, such as the number of occurrences of each unique token in the set of documents, and the language (if any) associated with the unique token. The language associated with a unique token may be determined based on the language associated with the document(s) in which the token is found. When a particular token is found in documents associated with more than language, the language associated with the token may be determined using any suitable methodology. One suitable methodology is a statistical methodology that is used while parsing the set of documents to identify unique tokens. Each token is initially assigned to the language of the first document in which it is found, and then for each subsequent occurrence of the token that occurs in a document of a language other than the current language assigned to the token, the token is reassigned to the other language only if a randomly (or pseudo-randomly) selected number between 0 and 1 is less than 1/N, where N is the current count of occurrences of the token. In other embodiments, any similar or otherwise suitable language assignment mechanism can be used to associate a language with each unique token. In some embodiments, a language is not associated with the unique tokens representing punctuation symbols. In yet another embodiment, while a language may be associated with every unique token, the language association is ignored when processing the N (e.g., 256) most frequently occurring tokens. As a result, the language associated with punctuation tokens is effectively ignored.

In some embodiments, the list of unique tokens, and the associated frequency and language information, is sorted based on frequency of occurrence of the unique tokens. Optionally, the entries can then be further sorted to facilitate space efficient encoding of the set of documents. For instance, in one embodiment, all the unique tokens are first sorted by frequency of occurrence. The resulting sorted list of unique tokens is then divided into bands. For instance, the top band, Band 0, may comprise the top 255 or 256 tokens (i.e., those with the highest frequency counts). The second band, Band 1, may comprise the top $2^{14}$ (i.e., 65,536) tokens, excluding the tokens in Band 0. The third band, Band 2, may comprise the next $2^{14}$ (i.e., 65,536) tokens in the sorted list of unique tokens. Of course, the number of tokens in each band may differ in other embodiments. Next, the tokens in each band are sorted in accordance with a second set of criteria. For instance, in one embodiment, the tokens in the first band are sorted alphabetically, that is by numeric or alphabetic value. Each of the other bands are sorted first by language, and then alphabetically. As a result, the sorted tokens in each band other than Band 0 are grouped by language, and within each language group the tokens are sorted alphabetically. In other embodiments, other sorting criteria may be used for sorting the unique tokens in each of the bands.

The sorting process produces a sorted list of the unique tokens, each having a respective position in the list. Each sorted unique token is then assigned a unique global token identifier (hereinafter also referred to as "GTokenID"). GTokenIDs can include any suitable data type and width depending upon the platform used to implement the document processing system 102 (e.g., 32-bit unsigned integers). In some embodiments, GTokenIDs are assigned to the sorted unique tokens in increasing order, so that high-frequency tokens are assigned small valued GTokenIDs and low-frequency tokens are assigned large valued GTokenIDs. To be more specific, in one embodiment, each token in the sorted list of tokens is assigned a 32-bit global token identifier equal to its numeric position in the sorted list of unique tokens. Thus, the first token in the list is assigned a GTokenID equal to 0 (i.e., 00000000 in hexadecimal format), the second token in the list is assigned a GTokenID equal to 1, and so on. The resulting set of mappings of GTokenIDs to unique token values is herein called the global-lexicon 206. In some embodiments, the global lexicon 206 actually comprises two mapping structures, one which maps GTokenIDs to tokens, and another that maps tokens to GTokenIDs. The mapping of tokens to GTokenIDs is used during the encoding process, while the mapping of GTokenIDs to tokens is used while decoding portions of the documents.

As will be explained more fully below, ordering the unique tokens based on frequency helps reduce the amount of space required for storing the mini-lexicons 208. This is true even in those embodiments in which bands of the unique tokens are sorted based on criteria other than frequency of occurrence, because the tokens in the bands assigned to lower GTokenIDs have higher frequencies of occurrence than the tokens in the bands assigned to higher GTokenIDs.

In some embodiments, "special" tokens that occur more frequently than the average token, such as HTML tags and punctuation, are assigned GTokenIDs which occupy a prefix 205 portion of GTokenIDs in the global-lexicon 206 (e.g., $GTokenID_0$-$GTokenID_{N-1}$). All other GTokenIDs can be offset by the last special GTokenID allocated to the prefix 205.

In the above discussion, the GTokenIDs are described as fixed length values, such as 32-bit unsigned integer values. However, these same GTokenIDs can also be considered to be variable length identifiers, because when the GTokenIDs are encoded for storage, the most significant bytes (or bits) that are equal to zero may be truncated or masked off during encoding. For instance, in some embodiments, all GTokenIDs with a value of less than $2^8$ are encoded as a single byte value, all GTokenIDs with a value of less than $2^{16}$ are encoded as a two-byte value, and all GTokenIDs with a value of less than $2^{24}$ are encoded as a three-byte value. In this way, the tokens having the highest frequencies of occurrence in the set of documents are represented by shorter length GTokenIDs than the tokens having lower frequencies of occurrence.

In the embodiments described below, the tokenspace repository is populated with fixed length LTokenIDs, rather than the variable-length GTokenIDs. However, mapping the LTokenIDs in the tokenspace repository back to the original tokens (which are also of variable length, of course) requires the storage of a large number of "mini-lexicons", and the content of the mini-lexicons comprises GTokenIDs. To efficiently store the mini-lexicons, the GTokenIDs in each mini-lexicon may be treated as variable length values. Alternately, the GTokenIDs in each mini-lexicon may be treated as a list that is first delta encoded, and then the resulting delta values are encoded using a variable length encoding scheme.

Mini-Lexicon Builder

After the global-lexicon 206 is generated, a set of mini-lexicons 208 are generated by the mini-lexicon builder 204 for use by the encoding/decoding system 110. Each entry in a mini-lexicon 208 includes a GTokenID and a corresponding local token identifier (LTokenID). The LTokenID for each entry is implied by the position of the entry in the mini-lexicon 208, and therefore does not need to be explicitly stored. Each respective mini-lexicon 208 is used only for encoding and decoding a distinct, respective specific range of token positions in the tokenized documents, thus allowing the same set of LTokenIDs to be used by each mini-lexicon 208. For example, a first mini-lexicon 208 (e.g., mini-lexicon A) having P (e.g., 256) entries is generated for the first P unique tokens encountered by the mini-lexicon builder 204 as it parses through the documents. Once the first P unique tokens have been encountered, a first entry in a "valid range map" 210 is made which includes the starting token position, $Start\_POS_A$, for the range of token positions for which the first mini-lexicon 208 is valid. Each of the P LTokenIDs in the first mini-lexicon 208 is assigned to a unique GTokenID. When all of the LTokenIDs have been assigned to GTokenIDs, a second mini-lexicon 208 (e.g., mini-lexicon B) is generated for the next P unique tokens encountered by the mini-lexicon builder 204, and a second entry is made in the valid range map 210 which includes the starting token position, $Start\_POS_B$, of the range of positions for which the second mini-lexicon 208 is valid. Thus, a token having a position in the tokenized documents that falls within the range $Start\_POS_B$ to $Start\_Pos_C$-1 can be decoded using mini-lexicon B, as shown in FIG. 2.

To provide a concrete example, in one embodiment the LTokenIDs in each mini-lexicon have values from 0 to 255, each represented by an 8-bit unsigned integer, while the GTokenIDs are 32-bit unsigned integers. A first mini-lexicon is generated by scanning the set of documents, starting at token position 0, until a predefined number P (e.g., 256) of distinct tokens are identified. The GTokenIDs for the P distinct tokens are assembled in a list. In some embodiments, the GTokenIDs in the list are sorted by numeric value, with the smallest GTokenIDs at the top of the list. LTokenIDs are then assigned to the GTokenIDs in the list, in accordance with the positions of the GTokenIDs in the list. For instance, the first GTokenID in the list is assigned an LTokenID of 0, the next GTokenID in the list is assigned an LTokenID of 1, and so on. The resulting mapping of LTokenIDs to GTokenIDs is called a mini-lexicon 208. A range of token positions, from Start_POS$_A$ to Start_POS$_B$, is associated with the mini-lexicon. A second mini-lexicon is generated by scanning the set of documents starting at the position Start_Pos$_B$ immediately following the last position associated with the first mini-lexicon. The scanning continues until the predefined number P of distinct tokens are identified, at which point a second mini-lexicon is generated using the same process as described above. The mini-lexicon builder 204 continues to generate a sequence of mini-lexicons 208 for subsequent ranges of token positions in the set of documents until all the tokens in the documents have been mapped to mini-lexicons 208.

In an alternate embodiment, the first F LTokenIDs in each mini-lexicon 208 are reserved for the F most popular tokens in the set of documents. For these F LTokenIDs, the LTokenID is always equal to the GTokenID. This assignment scheme facilitates fast decoding of documents. Whenever an LTokenID (in the tokenspace repository) having a value of F-1 or less is decoded, it can be mapped to a token directly in accordance with the global-lexicon without having to first map the LTokenID to a corresponding GTokenID.

The same set of LTokenIDs (e.g., 0 to 255) are used in each mini-lexicon 208. To facilitate compression of the documents, the LTokenIDs have a smaller width (e.g., 1 byte) than the GTokenIDs (e.g., 4 bytes). The difference of these widths (e.g., 3 bytes) represents a reduction in the number of bytes per token used to store the tokenized documents in the tokenspace repository 112. In an embodiment in which each LTokenID occupies one byte, a set of documents having 1 billion tokens will occupy 1 billion bytes (1 GB) in the tokenspace repository 112, ignoring the space occupied by other supporting data structures (which are described later in this document).

When the process of generating mini-lexicons 208 is complete, every token in the tokenized documents is associated with a mini-lexicon 208 based on its position in the tokenized documents. Note that each unique token in the tokenized documents may be associated with more than one mini-lexicon 208 if the token occurs in more than one position range. In one embodiment, an average document has approximately 1100 tokens and an average mini-lexicon 208 spans around 1000 tokens.

After each mini-lexicon 208 is generated, the tokens in the corresponding portion of the set of documents is mapped to LTokenIDs by the encoding/decoding system 110 and stored in the tokenspace repository 112 for subsequent retrieval. With this mapping, every token in the document repository 106 is mapped to a fixed length (e.g., one byte) LTokenID in the tokenspace repository 112. Thus, during decoding/decompression it is possible to jump from one token position to another in the tokenspace repository 112 without the need of skip tables or equivalent data structures, which can slow down the decoding process.

In some embodiments, the mini-lexicons 208 are encoded in a compressed format and stored until needed for document reconstruction. In one embodiment, the sorted list of GTokenIDs in each mini-lexicon 208 is delta encoded, and then the resulting list of delta values is encoded in a compressed format, preferably in a format that facilitates fast and efficient decoding and reconstruction of the mini-lexicon. A suitable data structure and encoding/decoding method are described in co-pending U.S. patent application Ser. No. 10/917,745, entitled "System and Method For Encoding And Decoding Variable-Length Data."

To decompress a particular document, the mini-lexicons 208 associated with the range of token positions for that document are decompressed into translation tables or mappings built from entries of the mini-lexicons 208 which translate the LTokenIDs to their corresponding GTokenIDs. Thus, decoding a tokenized document in the tokenspace repository 112 is accomplished by reading the fixed-length LTokenIDs stored in the tokenspace repository 112 for the document, and accessing the mini-lexicon for each token position in the document to translate the LTokenIDs into corresponding GTokenIDs. The GTokenIDs are then mapped into the corresponding tokens (e.g., text and punctuation) using the global-lexicon 206, thereby reconstructing all or a portion of the document.

Encoding System

FIG. 3A is a block diagram of an embodiment of an encoding system 300 for encoding documents for a tokenspace repository. The encoding system 300 includes an optional preprocessor 302, an optional delta encoder 304 and a variable-length data encoder 306. Variable-length data can include various data types, such as, without limitation, integers, character strings, floating-point numbers, fixed-point numbers and the like. The variable-length data includes but is not limited to text, images, graphics, audio samples and the like.

In some embodiments, a list of information is received by the preprocessor 302 which orders the information for efficient encoding. The preprocessor 302 may order the data into a monotonic sequence using one or more sorting algorithms. For example, if a set of integers are sorted by value, then adjacent integers will be close in magnitude, thus enabling the delta encoder 304 to generate delta values that are small valued integers for encoding. The ordered data is received by the delta encoder 304, which computes differences between adjacent pairs of the ordered data to obtain the small valued integers. The small valued integers are received by the variable-length data encoder 306, which encodes the data into a compressed format which can be efficiently decoded. One example of a suitable variable-length data encoder 306 is described more fully in co-pending U.S. patent application Ser. No. 10/917,745, entitled "System and Method For Encoding And Decoding Variable-Length Data."

Various information generated by the document processing system 102 can be encoded using all or part of the encoding system 300. In some embodiments, the GTokenIDs in each mini-lexicon 208 are sorted using the preprocessor 302 to ensure that integer values closest in magnitude will be delta encoded. The ordered GTokenIDs are then delta encoded by the delta encoder 304 to provide difference or residual values. The difference values are then encoded in groups (e.g., groups of 4 values) into a compressed format using the variable-length data encoder 306. In some embodiments, lists of token positions in an inverse index are similarly encoded to facilitate fast and efficient decoding of the positions, as described more fully with respect to FIG. 4.

While the variable-length data encoder 306 provides a compressed format that facilitates fast and efficient decoding, other known encoding schemes can also be used in the document processing system 102 to compress a list of information (e.g., CCITT-G4, LZW etc.).

Decoding System

FIG. 3B is a block diagram of an embodiment of a decoding system 308 for decoding documents in a tokenspace repository. The decoding system 308 includes a variable-length data decoder 310 and an optional delta decoder 312. In some embodiments, encoded groups of data are received by the variable-length data decoder 310, which decodes the groups with the assistance of one or more offset/mask tables. The decoded data is received by the delta decoder 312, which computes running sums, thereby producing delta-decoded data, which is equivalent to the original list of information. The use of offset/mask tables in decoding group encoded variable-length integer values is described more fully in co-pending U.S. patent application Ser. No. 10/917,745, entitled "System and Method For Encoding And Decoding Variable-Length Data."

Attribute Encoding/Decoding System

Figure 3C:
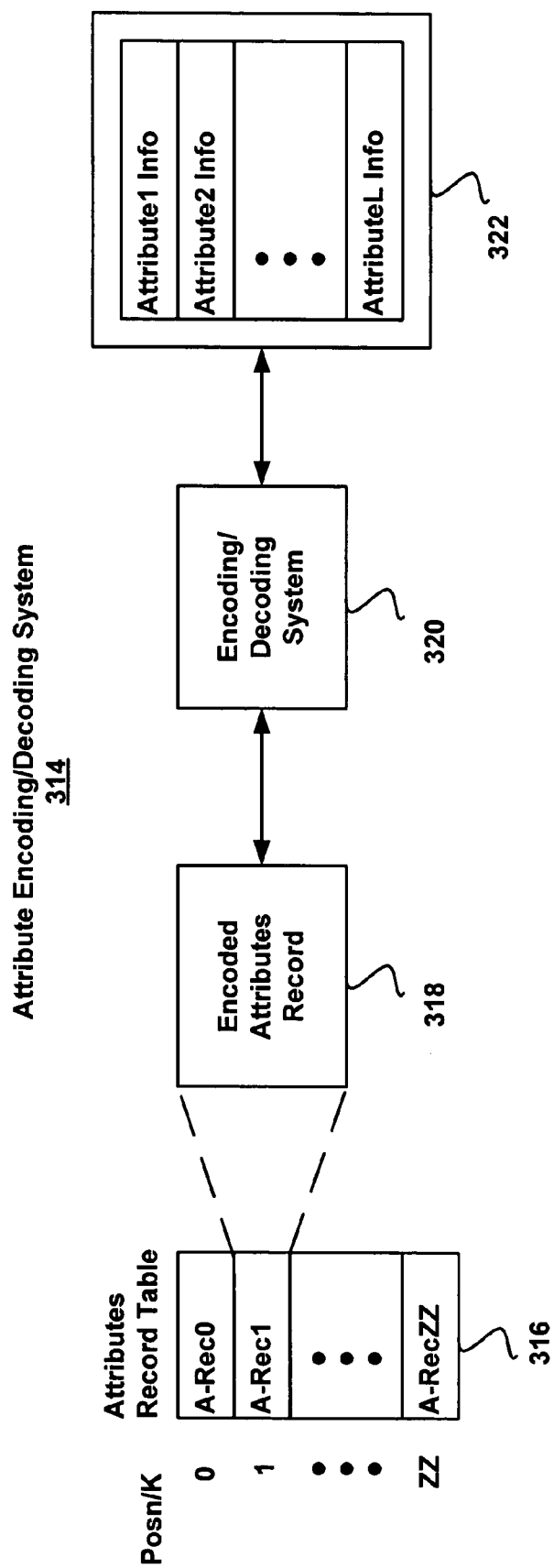
FIG. 3C is a block diagram of an embodiment of an attribute encoding/decoding system for encoding/decoding document attributes.

FIG. 3C is a block diagram of an embodiment of an attribute encoding/decoding system 314 for encoding/decoding document attributes. The attribute encoding/decoding system 314 includes an encoding/decoding system 320 which encodes attribute information 322 into attribute records 318 for storage in an attribute table 316. The attributes for a document are determined on a token-by-token basis, with a 0 or 1 bit value being used to represent the presence or absence of each attribute for a given token. For instance an attribute record 318 in the attribute table may be conceptually represented as an A.times.K bit map, where A is the number of attributes that are encoded and K is the number of tokens whose attributes are represented by the record 318. If A is 8 and K is 32, then each attribute record 318 stores eight attributes for each of 32 tokens. Each attribute record 318 may be encoded so as to compress the amount of space occupied by the attributes table while enabling very fast decoding of selected attribute records during query processing. One suitable methodology for encoding and decoding the attribute records 318 is described in co-pending U.S. patent application Ser. No. 10/917,745, entitled "System and Method For Encoding And Decoding Variable-Length Data." Alternately, the information in each attribute record may be run-length encoded.

The set of attributes that are recorded in the attribute table 316 can include one or more font attributes (e.g., bold, underlined, etc.), one or more document position attributes (e.g., title, heading), metadata and any other features or characteristics that can be used to distinguish between the tokens in a set of documents. In some embodiments, the attributes of the tokens in a set of documents are identified and encoded at the same time that the tokenized documents are encoded and stored in the tokenspace repository, as described above. The encoded attributes are used in one or more stages of relevancy scoring, as described more full with respect to FIG. 5.

Document Repository Encoding and Decoding System—Second Embodiment

FIGS. 8A and 8B are block diagrams of an embodiment in which a tokenized collection of documents (a "tokenspace repository") is encoded in a somewhat different way than the one described above. As described above, a global lexicon builder 202 tokenizes the set of documents 106, identifies all unique tokens, and assigns global token identifiers to all the unique tokens. The result is a global lexicon 206. Next, the set of documents (which have been tokenized) are processed by a region lexicons builder 804. Conceptually, the set of documents are divided into regions 820, and each region 820 is divided into blocks 822. The region lexicons builder 804 builds a "lexicon" or dictionary 830 for each region, and an encoding system 810 generates a set of encoded tokens 832 for each region, plus a set of block offsets 834 for each region. The region lexicon 830, the encoded tokens 832 and the block offsets 834 (each of which will be described in more detail next) together form an encoded representation of a respective region 820 of the set of documents.

In one embodiment, the set of documents is divided into regions 820, each of which (except perhaps a last region) has a predetermined, fixed size, such as 8192 tokens (or any other appropriate size). Each block 822 of a region 820 also has a predefined, fixed size, such as 64 tokens (or any other appropriate size).

In one embodiment, the "lexicon" 830 for a respective region 820 is an ordered listing of the longest sequences of tokens having the highest repeat rates, or any similar structure. The lexicon 830 may be built by building a table of candidate token strings in the region, determining their repeat counts within the region, and then selecting the best candidates until a maximum lexicon size is reached. In an exemplary embodiment, the maximum lexicon size is 64 tokens, but any other appropriate size limit may be used in other embodiments. As will be described next, the lexicon 830 is used as a context for encoding each of the blocks 822 of the respective region 820, enabling a highly compressed representation of the region. In some embodiments, one or more of the region lexicons 830 may be encoded in a compressed format, for instance using the encoding method described in U.S. patent application Ser. No. 10/917,745, filed Aug. 13, 2004, entitled "System and Method For Encoding And Decoding Variable-Length Data," referenced earlier in this document.

Referring to FIGS. 9A and 9B, in one embodiment the encoding system 810 encodes each block 822 of tokens as follows. The lexicon 830 for the corresponding region is treated as a set of tokens that immediately precede the tokens of the block. In sequence, the tokens of the block are processed from first to last, matching each token and as many subsequent tokens as possible with the longest matching token sequence in the preceding sequence of tokens, including the lexicon 830. If a matching preceding sequence is found, a "copy code" is generated. Otherwise a "literal code" is generated to represent the token. All tokens covered by the current code are then treated as preceding tokens for subsequence processing of the next token (if any) in the block. As shown in FIG. 9B, each "code" representing the set of tokens in a block may include a type field 902. If the code is a "literal code" the second portion 904 of the code represents the global token identifier. In some embodiments, this type field 902 indicates the number of bits required to represent the global token identifier. For example, in one embodiment, the type code 902 can indicate up to seven distinct literal codes, each having a corresponding global token identifier length. In other embodiments, the number of distinct type codes may be more or less than eight (e.g., one indicating a copy code and the rest indicating literal codes). If the literal code is a "copy code" the second portion 906 of the code may include a pointer 908 and a length 910, where the pointer 908 indicates where in the preceding text to start, and the length 910 indicates the length of the matching sequence (i.e., the number of tokens to be copied during decoding). Thus, if a matching sequence of, say, four tokens is found by the encoding system 810, beginning at a location 31 tokens preceding the current position, then the code for this sequence would be:

<type=copy, ptr=31, length=4>.

The length of a copy code (as measured in bits) will depend on the maximum token length of the region lexicon 830 and the maximum token length of the block, the maximum allowed length of a matching sequence, and the number of distinct codes. In one example, the type field 902 is 3 bits (allowing 8 type codes), the pointer field 908 is 7 bits and the length field 910 is 2 bits, for a total of 12 bits. Other bit lengths for each field of a copy code may be used in other embodiments. The length of each literal code (as measured in bits) is specified by the type of the literal code.

Referring back to FIG. 8B, as the encoding system 810 encodes the blocks of a region, the encoding system 810 generates a set of block offsets 834 indicating the locations of the encoded tokens for each block of the region. In one embodiment, the block offset of the first block of the region is a pointer into the token repository, and each of the other block offsets for the region is a relative offset with respect to the starting position of the first block in the region. In one embodiment the region lexicons 830 and block offsets 834 are stored in a table or equivalent data structure that is indexed in accordance with the starting positions of the regions 820 divided by the fixed region size. From another viewpoint, each region 820 is assigned a Region Number comprising its starting position divided by the fixed region size, and the data structure(s) in which the region lexicons 830 and block offsets 834 are stored are indexed by Region Number.

Decoding a block 822 of a region 820 is accomplished by locating the region lexicon 830 of the corresponding region, locating the encoded block using the block offsets 834 for the region, and then decoding the set of the codes for the block so as to produce a sequence of global token identifiers. The resulting sequence of global token identifiers, or any subset thereof, may then be converted into a corresponding set of symbols or terms using the global lexicon 206.

Query Processing System

Figure 4:
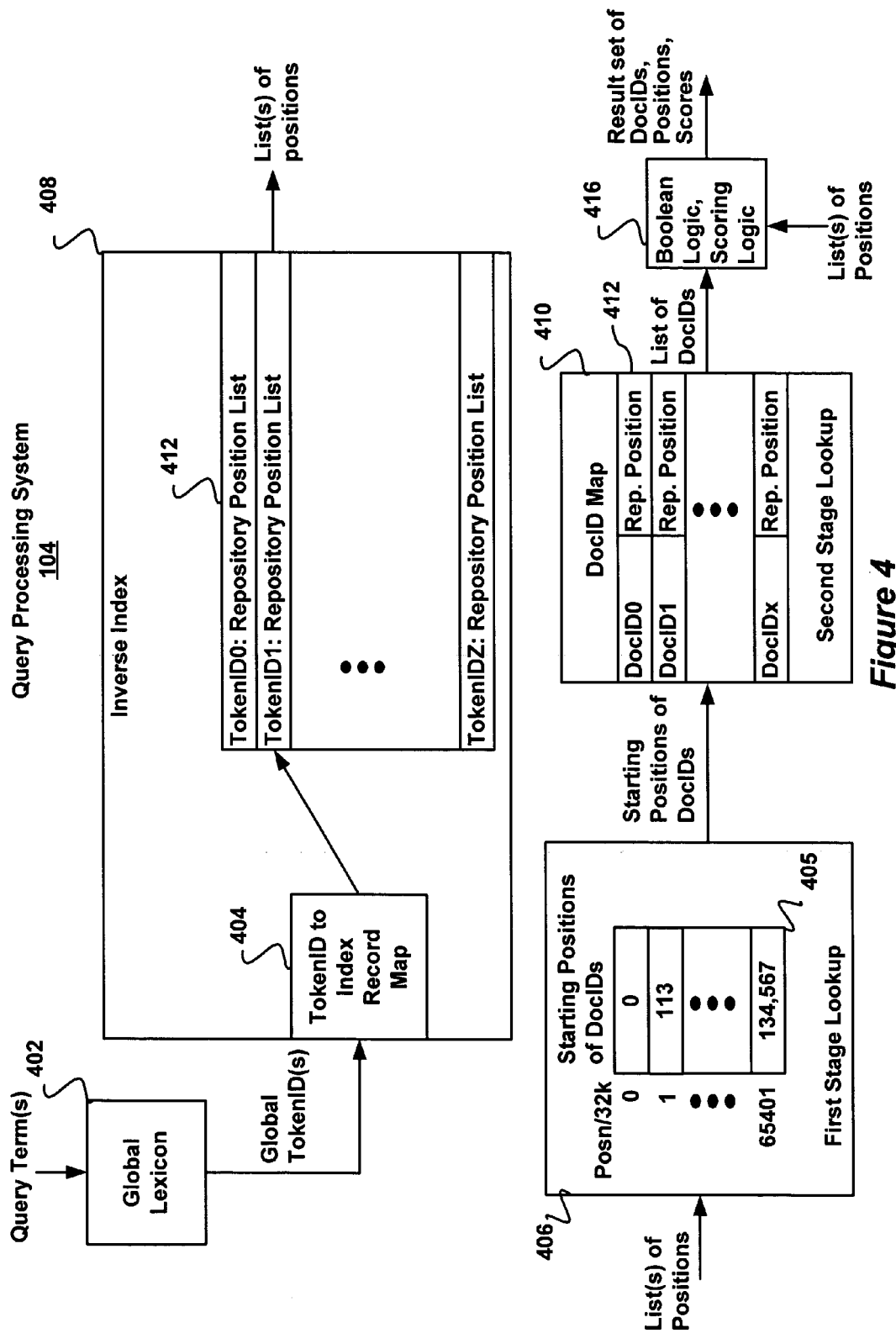
FIG. 4 is a block diagram of an embodiment of a query processing system for use with a tokenspace repository.

FIG. 4 is a block diagram of an embodiment of the first stage of a query processing system 104 for use with a tokenspace repository. The query processing system 104 includes a global-lexicon 402, a tokenspace inverse index 408, a first stage look-up table 406 and a second stage look-up table 410. Query terms or strings are received by the global-lexicon 402 which translates query terms into GTokenIDs using a translation table or mapping built from entries of the global-lexicon 402. The GTokenIDs are received by the inverse index 408, which includes a map 404 for mapping the GTokenIDs to index records 412 stored in the inverse index 408. Each index record 412 identified using the map 404 contains a list of token positions, which directly correspond to token positions in the tokenspace repository 112. In some embodiments, the inverse index 408 is generated after the global-lexicon is generated, and may be generated during the same pass through the documents that is used to generate the mini-lexicons.

In some embodiments, the inverse index 408 provides a list of positions which can be used as an index into the first stage look-up table 406. When the query contains multiple terms, multiple lists of positions are produced by the inverse index 408. To avoid having to search the entire DocID map 410 for an entry corresponding to each position in the list(s) of positions, the first stage look-up table 406 has one entry for each block of positions in the tokenspace repository. For example, each block may have a size of 32,768 positions, and each entry may have a pointer to a first entry in the DocID lookup table 410 for the corresponding block of positions. Thus, the first stage look-up table 406 translates the list(s) of positions into starting point positions for document identifier (DocID) entries 412 in the second stage look-up table 410, which is sometimes called the DocID table 410. Alternately, tables 406 and 410 may be jointly called the DocID lookup table. Each entry 412 in the second stage look-up table 410 includes a DocID (document identifier) and a starting repository position for the corresponding document. The last token in any document is the position immediately prior to the starting position identified by the next entry 412 in the second stage look-up table. The starting point positions Start_POS$_{A-Z}$ for DocIDs are received by the second look-up table 410 which translates the starting point positions into a list of DocIDs for each of the query terms.

In some embodiments, the first stage query processor includes logic 416 for producing a result set. The lists of DocIDs are merged by logic 416, in accordance with the Boolean logic specified by the query or query tree, to form a result set of DocIDs. The logic 416 may also optionally filter the lists of token positions to eliminate token positions not located within the documents corresponding to the DocIDs in the result set. Furthermore, a scoring function may be applied to the result set, using the DocIDs and token positions within each document identified by the DocIDs so as to associate a score (sometimes called a query score) with each DocID in the result set.

Multi-Stage Query Processing

Figure 5:
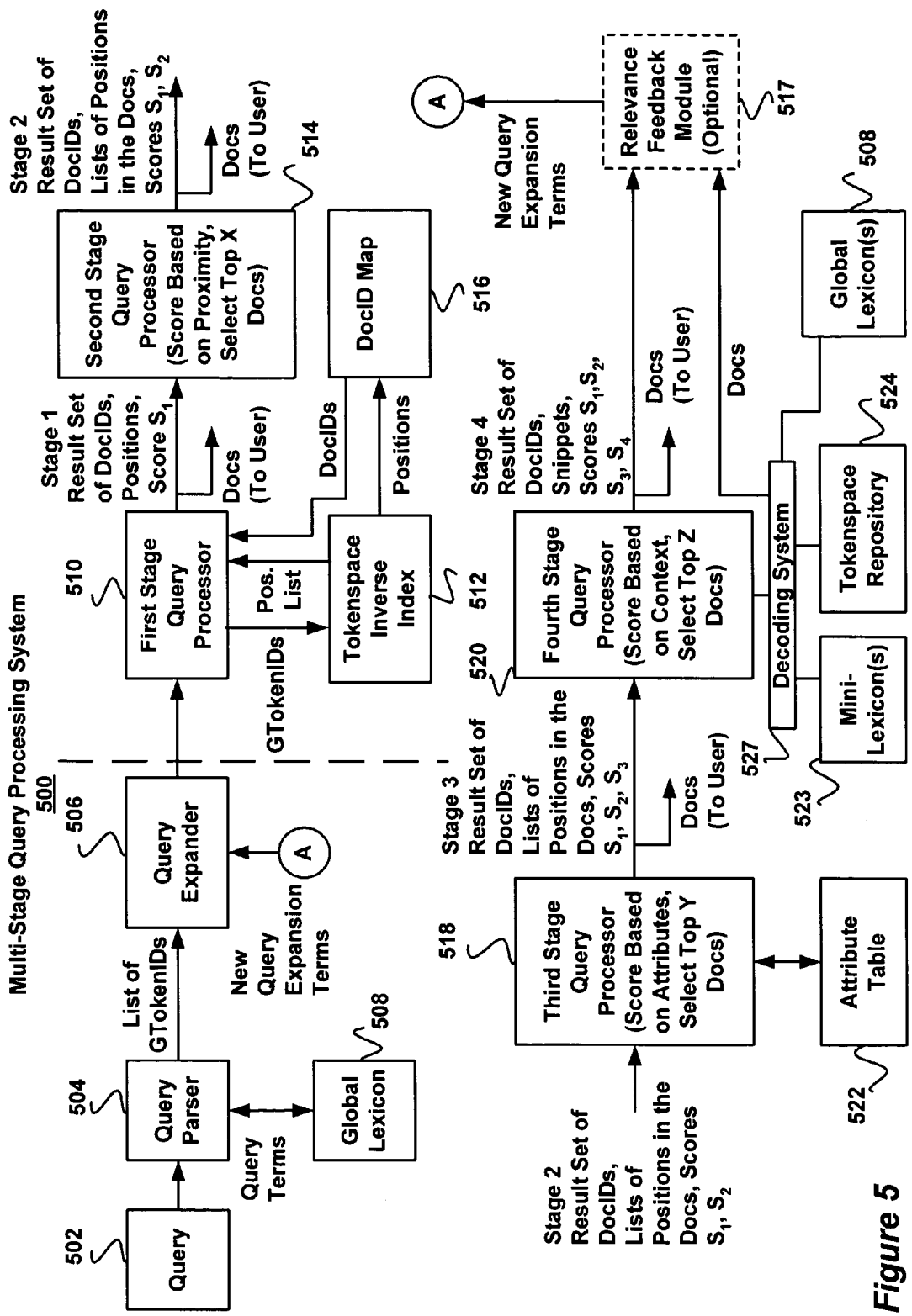
FIG. 5 is a block diagram of an embodiment of a multi-stage query processing system for use with a tokenspace repository.

FIG. 5 is a block diagram of an embodiment of a multi-stage query processing system 500 for use with a tokenspace repository 524. In some embodiments, the query processing system 500 includes four stages of query processing and relevancy score generation, including a first stage query processor 510, a second stage query processor 514, a third stage query processor 518 and a fourth stage query processor 520. Note that more or fewer query processor stages can be used in the system 500 depending upon the application. Each stage calculates one or more sets of relevancy scores which can be returned to the user and/or combined with relevancy scores generated in previous stages, depending upon the application.

Query Processing—Stage I

The first stage query processor 510 was generally described with respect to FIG. 4. A query string 502 is tokenized and parsed by a query parser 504 into query terms (i.e., each distinct term in the query is treated as a token). The tokenized query terms are translated by the global-lexicon 508 to corresponding GTokenIDs using a translation table or mapping, as previously described with respect to FIGS. 2 and 4. Since users may employ special operators in their query string, including Boolean, adjacency, or proximity operators, the system 500 parses the query into query terms and operators. These operators may occur in the form of reserved punctuation (e.g., quotation marks) or reserved terms in a specialized format (e.g., AND, OR). In the case of a natural language processing (NLP) system, operators can be recognized implicitly in the language used no matter how the operators might be expressed (e.g., prepositions, conjunctions, ordering, etc.). Other query processing may also be included in the first stage query processor 510, such as deleting stop words (e.g., "a", "the", etc.) and term stemming (i.e., removing word suffixes).

Next, the list of GTokenIDs are processed by a query expander 506, which generates a query tree or other query representation that takes into account any operators used in the query string (e.g., a Boolean expression). Optionally, the query expander 506 may also expand the query in various ways. For instance, a query term may be converted into a subtree containing the term and one or more synonym terms or other terms related to the query term, with the terms in the subtree being related to each other by an OR operator or parent node.

As will be described in more detail below, in some embodiments a query is processed one or more times by the sequence of query processing stages shown in FIG. 5. On each pass (other than the last), additional query expansion terms are generated (as will be explained below), and then these additional terms are added to the query tree. The query tree can also be used as a scoring tree, with weights being associated with terms in the query tree. The expanded query tree can also include supplemental terms and subtrees of terms that are not required to be present in documents responsive to the query, but which are used in scoring the relevance of documents responsive to the query. If there is more than one query term, during the first pass weights may be computed for the query terms to improve the search results.

In some embodiments, the first pass through the system 500 processes a random sample of documents from a document corpus. The size of the random sample can be selected based on one or more smaller random samples that can be used by the system 500 to estimate a number of documents that match the query across the document corpus. In other embodiments, a first document corpus (e.g., a set of query sessions) is used in the first pass through the system 500 and a second, different corpus is used in a second or subsequent pass through the system 500. Using previous sets of query sessions enables the system 500 to determine other related terms that commonly co-occur in similar queries. These related terms can be used by the query expander 506 to expand the query for subsequent passes.

The first stage query processor 510 uses the query terms to search against a tokenspace inverted index 512 and to identify documents matching the query. The first stage query processor 510 accesses the inverse index 512 to produce a list of token positions (also called tokenspace repository positions) for terms in the query tree and accesses the DocID Map 516 to produce a set of DocIDs for the documents corresponding to the token positions. In addition, the first stage processor 510 performs the Boolean logic specified by the query or query tree so as to generate a set of DocIDs that are responsive to the query. In some embodiments, the first stage query processor 510 also computes a first set of relevancy scores $S_1$ between the query and each document based on one or more scoring algorithms. In general, scoring algorithms provide relevancy rankings for each matching document based on one or more query features, including but not limited to, the presence or absence of query term(s), term frequency, Boolean logic fulfillment, query term weights, popularity of the documents (e.g., a query independent score of the document's importance or popularity or interconnectedness), proximity of the query terms to each other, context, attributes, etc. In one embodiment, the first set of relevancy scores $S_1$ are based on a set of factors that include presence of query terms, term frequency and document popularity.

In some embodiments, the first set of relevancy scores $S_1$ can be used to select documents for presentation as an ordered list to the user, who can then simply click and follow internal pointers to the selected document. In other embodiments, the first set of relevancy scores $S_1$, together with DocIDs and corresponding positions, are provided to the second stage query processor 514 for further processing.

Query Processing—Stage II

The second stage query processor 514 receives a set of DocIDs, a list of tokenspace repository positions for the corresponding documents, and a first set of relevancy scores $S_1$ from the first stage query processor 510. The second stage query processor 514 uses the list of positions to generate a second set of relevancy scores $S_2$ based on the proximity or relative positions of query terms found in the documents. When the terms in a query occur near to each other within a document, it is more likely that the document is relevant to the query than if the terms occur at greater distance. Thus, the second set of relevancy scores $S_2$ are used to rank documents higher if the query terms occur adjacent to one another or in close proximity, as compared to documents in which the terms occur at a distance. In some embodiments, the second set of relevancy scores $S_2$ can be used to select the top X documents for presentation as an ordered list to the user, who can then simply click and follow internal pointers to the selected document. In some embodiments, the second set of relevancy scores $S_2$ is derived in part from the first set of relevancy scores $S_1$ (e.g., by adjusting the $S_1$ scores in accordance with the additional scoring factors used by the second stage query processor 514) to generate an ordered list of documents (ordered in accordance with the second set of relevancy scores $S_2$) for presentation to the user, and/or for further processing by the third stage query processor 518.

Query Processing—Stage III

In some embodiments, the second stage query processor 514 is coupled to a third stage query processor 518 for handling term attributes (e.g., font attributes, title, headings, metadata, etc.) which have been encoded in an attribute table 522, as previously described with respect to FIG. 3C. The third stage query processor 518 receives a set of DocIDs, a list of tokenspace repository positions for the corresponding documents, and the second set of relevancy scores $S_2$ from the second stage query processor 514. Alternately, the third stage query processor receives the first set of relevancy scores $S_1$ as well as the second set of relevancy scores $S_2$.

Some studies show that the location of a term in a document indicates its significance to the document. For example, terms occurring in the title of a document that match a query term may be weighted more heavily than query terms occurring in the body of the document. Similarly, query terms occurring in section headings or the first paragraph of a document are likely to be more indicative of the document's relevancy to the query than terms occurring in less prominent positions within the document. Other attributes that may be used as indicators of relevancy include bolded text, underlined text and font size. Thus, the third set of scores $S_3$ are determined using the attributes of tokens in the documents that match the query terms. Referring to FIG. 3C, to access the attributes for the query terms in a document (i.e., the attributes of the tokens matching or relevant to the query terms), the token positions of the query terms in the document are used to index into the attribute table 316 (522 in FIG. 5). More specifically, if the number of tokens whose attributes are encoded by each attribute record 318 is K, then the token positions divided by K are used to index into the attribute table 316. In some embodiments, the identified attribute record or records 318 are stored in an encoded, compressed form, and thus must be decoded in order to determine the attributes associated with each of the query terms.

In some embodiments, the third set of relevancy scores $S_3$ can be used to select the top Y documents for presentation as an ordered list to the user, who can then simply click and follow internal pointers to the selected document. In some embodiments, the third set of relevancy scores $S_3$ is derived in part from one or more of the first and second sets of relevancy scores $S_1$ and $S_2$, to generate an ordered list of documents for presentation to the user, and/or for further processing by the fourth stage query processor 520. In one embodiment, the $S_3$ scores are produced by adjusting the $S_2$ scores in accordance with the additional scoring factors produced by the third stage query processor 518.

Query Processing—Stage IV

The fourth stage query processor 520 receives a set of DocIDs, a list of positions in the documents corresponding to the DocIDs, and the third set of relevancy scores $S_3$ from the third stage query processor 518. The fourth stage query processor 520 may optionally receive the first and/or second sets of relevancy scores $S_1$ and $S_2$ as well. The fourth stage query processor 520 is coupled to a decoding system 527, which in turn is coupled to one or more mini-lexicon maps 523, a tokenspace repository 524 and one or more global-lexicon maps 508. The mini-lexicon maps 523, tokenspace repository 524 and global lexicon maps 508 were all previously described with respect to FIGS. 1 and 2.

The fourth stage query processor 520 generates a fourth set of relevancy scores $S_4$ based on context, and may also generate a "snippet" for one or more of the documents listed in the result set. Snippets are small portions of text from a document, and typically include text that appears around the keywords being searched. In one embodiment, to generate a snippet for a document listed in the result set, the query processor decodes a predefined number of tokens positioned before and after the first occurrence of each query term present in the document, thereby reconstructing one or more text portions of the document, and then selects a subset of the text portions to include in the snippet. Using the list of positions in the result set, the decoding system 527 can select the mini-lexicons 523 that are needed to decode the portions of a document that precede and follow the occurrences of the query terms in the document. The selected mini-lexicons 523 and the global-lexicon 508 are used to translate LTokenIDs in the tokenspace repository into GTokenIDs, and to then translate the GTokenIDs into tokens, as described above with respect to FIG. 2.

In some embodiments, the fourth set of relevancy scores $S_4$ can be used to select the top Z documents for presentation as an ordered list to the user, who can then simply click and follow internal pointers to the selected document. In some embodiments, the fourth set of relevancy scores $S_4$ is derived in part from one or more of the first, second and third sets of relevancy scores $S_1$, $S_2$ and $S_3$, to generate an ordered list of documents for presentation to the user, and/or for further processing by a relevance feedback module 517. In an alternate embodiment, the last stage query processor generates snippets for the documents having the highest scores in the relevancy scores produced by the preceding query processor stage, but does not generate a new set of relevancy scores $S_4$.

In some embodiments, the final set of relevancy scores are provided to a relevance feedback module 517 which generates one or more new query expansion terms based on documents in the result set produced by the last query stage. For example, the relevance feedback module 517 could implement one or more known relevance feedback algorithms, including but not limited to, pseudo-relevance feedback algorithms based on a full document approach (pseudo relevance feedback based on a whole web page), Document Object Model (DOM) segmentation, Vision-based Page Segmentation (VIPS), conceptual relevance feedback using concept lattices, etc. The relevance feedback algorithms can analyze the documents vetted from the previous query processing stages and generate query expansion terms based the results of the analysis. The new query expansion terms are provided to the query expander 506 which generates a new query expression to be processed by one or more of the query processors 510, 514, 518 and 520. Thus, the multi-stage query processing system 500 is capable of executing two or more passes on a query, and using information from each pass to generate improved queries which will ultimately result in the user receiving more relevant documents.

In one embodiment, the last query stage processor 520 produces long snippets when performing the first pass processing of a query, for example including N (e.g., 10 to 40) tokens preceding and following each occurrence of the query terms in a document. The snippet may be truncated if it exceeds a predefined length. The query and the long snippets produced by the last query stage 520 are provided to the relevance feedback module 517, along with the relevance scores, so as to generate a set of query expansion terms, and, optionally, a set of query term weights as well. During a second pass processing of the expanded query, the last query stage 520 produces short snippets, suitable in length and content for display with the list of documents in the result set having the highest or best scores.

In one embodiment, the query processing system contains L parallel query processing sub-systems, each of which contains an inverse index 512 and a tokenspace repository 524 for a respective subset of a collection of documents. For instance, a query processing system may include over a thousand parallel query processing sub-systems. The relevance feedback module 517 (FIG. 5) may be shared by all the query processing sub-systems. During a first pass through the query processing system, the query is processed by a small portion of the parallel query processing sub-systems, while during a second pass the query is processed by the entire query processing system. For instance, the query processing system may be divided into S subsets (e.g., 32 subsets), and each query is assigned to one of the subsets in accordance with the result of applying a hash function to a normalized version of the query, and then applying a modulo function to the result produced by the hash function. Each subset of the query processing system may be called a "partition" of the query processing system, and each query processing sub-system may be called a "sub-partition".

The main purpose of the first pass processing of the query is to produce a set of query expansion terms, and query term weights, so as to improve the quality of the query results produced by the second pass processing of the query. As long as the documents in the query processing system are fairly randomly distributed across the query processing sub-systems, the query needs to be processed by only a small number of sub-systems to produce a set of query expansion terms. The query expansion terms are used by the query expander 506 to produce an expanded query tree or query expression, which is then processed by the query processing stages (in a second pass processing of the query) as described above. For example, the query "new york pictures" might be expanded to "new york (pictures or images or image or picture)." The result set and snippets produced by the last query stage during the second pass may be formatted for display (or, more generally, presentation) by the computer or device from which the query was received.

In one embodiment, the first pass processing of the query is performed on a different database than the subsequent passes. For instance, the initial database for the first pass may be a database of previously processed queries, while the database used for the subsequence passes may be a set of documents having an inverse index for mapping query terms to documents in the database.

Document Processing Server

Figure 6:
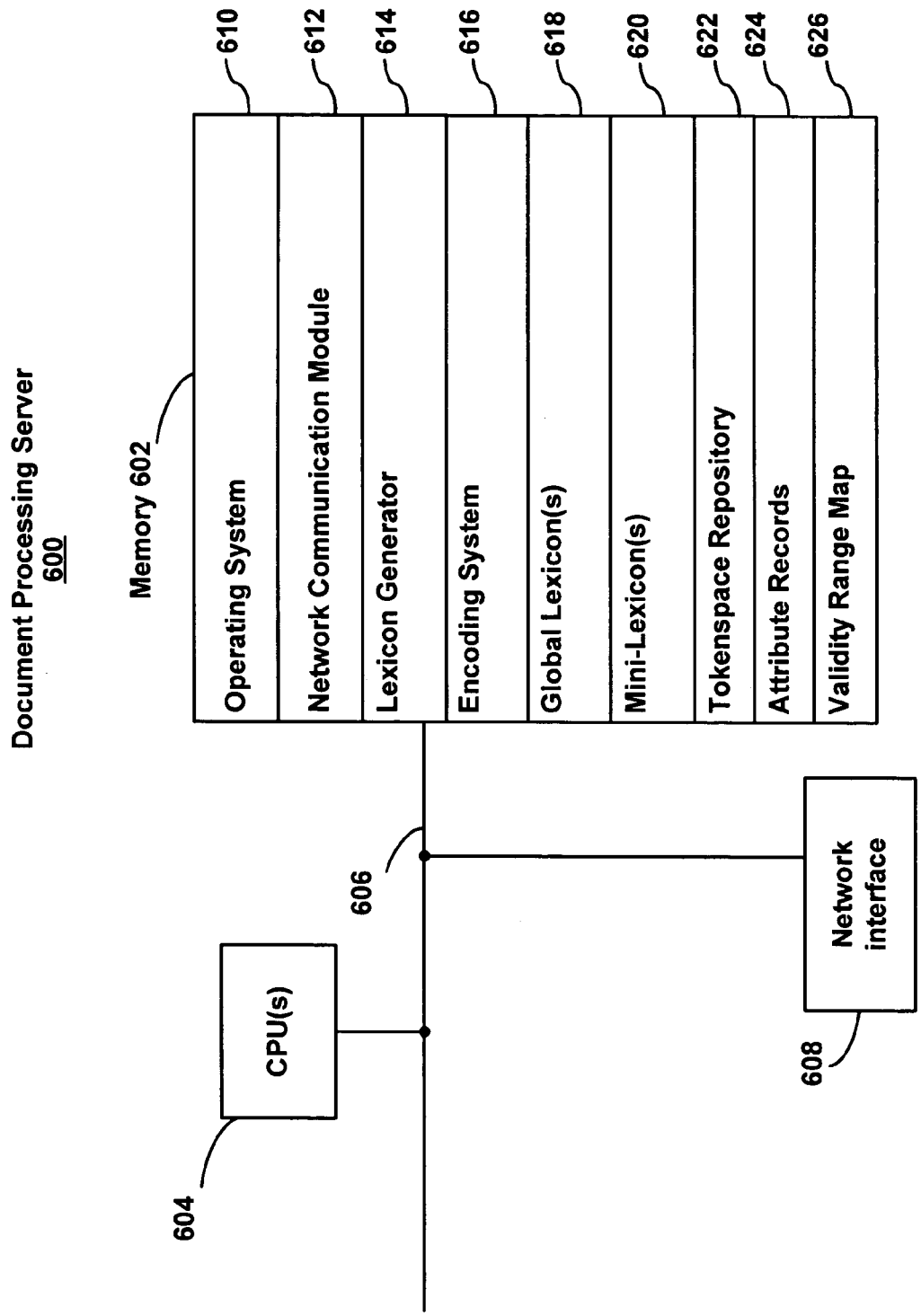
FIG. 6 is a block diagram of an embodiment of a tokenspace repository server.

FIG. 6 is a block diagram of an embodiment of a tokenspace repository server 600. The server 600 can be a stand alone computer system or part of a distributed processing system including multiple computer systems. The server 600 generally includes one or more processing units (CPUs) 604, one or more network or other communications interfaces 608, memory 602, and one or more communication buses 606 for interconnecting these components. The server 600 may optionally include a user interface, for instance a display and a keyboard. Memory 602 may include high speed random access memory and may also include non-volatile memory, such as one or more magnetic disk storage devices. Memory 602 may include mass storage that is remotely located from the central processing unit(s) 604.

The memory 602 stores an operating system 610 (e.g., Linux or Unix), a network communication module 612, a lexicon generator 614 (e.g., the lexicon generator 108), an encoding system 616 (e.g., encoding system 300), one or more global-lexicons 618 (e.g., global-lexicon 206), one or more mini-lexicons 620 (e.g., mini-lexicons 208), a tokenspace repository 622 (e.g., tokenspace repository 112), attribute records 624 (e.g., attribute records table 316), and a validity range map 626 (e.g., validity range map 210). The operation of each of these components has been previously described with respect to FIGS. 1-5.

Query Processing Server

Figure 7:
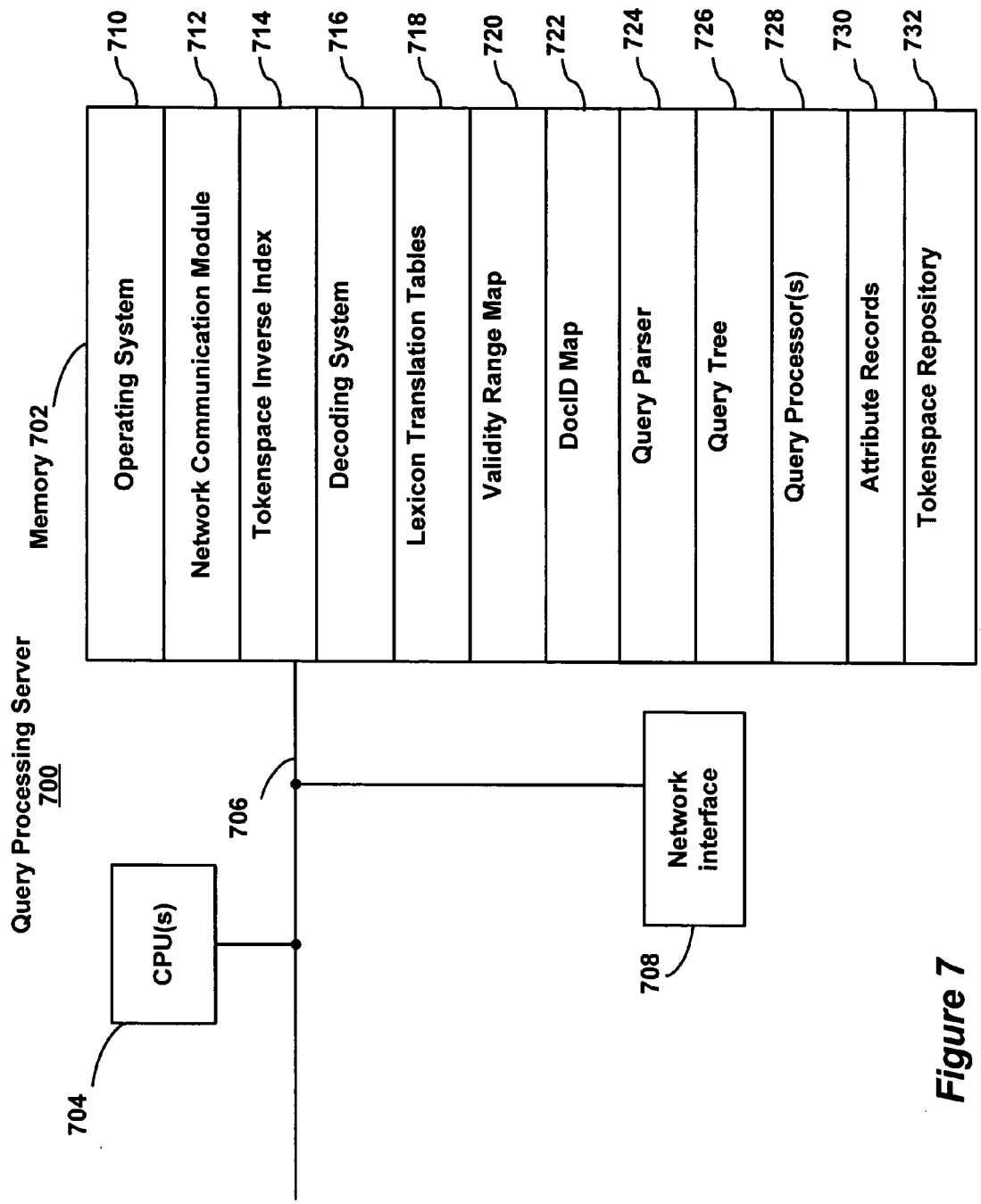
FIG. 7 is a block diagram of an embodiment of a query processing server.

FIG. 7 is a block diagram of an embodiment of a query processing server 700. The server 700 can be a stand alone computer system or part of a distributed processing system including multiple computer systems. The server 700 generally includes one or more processing units (CPUs) 704, one or more network or other communications interfaces 708, memory 702, and one or more communication buses 706 for interconnecting these components. The server 700 may optionally include a user interface, for instance a display and a keyboard. Memory 702 may include high speed random access memory and may also include non-volatile memory, such as one or more magnetic disk storage devices. Memory 702 may include mass storage that is remotely located from the central processing unit(s) 704.

The memory 702 stores an operating system 710 (e.g., Linux or Unix), a network communication module 712, a tokenspace inverse index 714 (e.g., tokenspace inverse index 408), a decoding system 716 (e.g., a decoding system 308), one or more lexicon translation tables or mappings 718 (e.g., derived from global-lexicon 206 and mini-lexicons 208), a validity range map 720 (e.g., validity range map 210), a DocID map 722 (e.g., DocID map 410), a query parser 724 (e.g., query parser 504), query tree 726, one or more query processors 728 (e.g., query processors 510, 514, 518 and 520), attribute records 730 (e.g., attribute records table 316), and a tokenspace repository 732 (e.g., tokenspace repository 112). The operation of each of these components has been previously described with respect to FIGS. 1-5.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of processing a query in a multi-stage query processing system, comprising:
  performing first stage processing of the query, including:
    retrieving from an index, a list of token positions for one or more query terms in the query, wherein the token positions in the list specify positions of individual tokens that match the query terms;
    based on the list of token positions, producing a first set of document identifiers, and
    generating a first set of relevancy scores for a first set of documents corresponding to the first set of document identifiers;
  performing a second stage processing of the query, including:
    generating a second set of relevancy scores for the documents in the first set of documents based on one or more of: the list of token positions, distances between query terms in the documents, attributes of tokens in the documents, and a context in which a query term is used in a document of the first set of documents, and
    selecting a subset of the first set of documents based on the second set of relevancy scores;
  automatically generating one or more new query expansion terms based on documents in the subset of the first set of documents; and
  generating a new query expression based on the query and the one or more new query expansion terms for processing by at least the first processing stage to produce at least a second set of document identifiers corresponding to a second set of documents.

2. The method of claim 1, further comprising:
  reconstructing one or more portions of the first set of documents using the list of token positions.

3. The method of claim 2, further comprising:
  presenting the reconstructed portions to a user with an ordered list of documents selected from the first and second sets of documents based at least in part on the second set of relevancy scores.

4. The method of claim 1, further comprising:
  adjusting the first set of relevancy scores for the documents in the first set of documents based on one or more of: the list of token positions, attributes of tokens in the documents, and a context in which a query term is used in a document of the documents to generate the second set of relevancy scores.

5. The method of claim 1, further comprising:
  during the second stage processing of the query, generating snippets for one or more documents in the subset of the first set of documents; and
  automatically generating one or more new query expansion terms based on the snippets.

6. The method of claim 1, wherein the token positions in the list of token positions are positions in a document repository having a range of token positions, wherein documents in the repository have distinct non-overlapping sub-ranges of token positions within the document repository's range of token positions.

7. A computer readable storage medium storing one or more programs configured for execution by a computer, the one or more programs comprising instructions to:
perform first stage processing of the query, including:
retrieving from an index, a list of token positions for one or more query terms in the query, wherein the token positions in the list specify positions of individual tokens that match the query terms;
based on the list of token positions, producing a first set of document identifiers, and
generating a first set of relevancy scores for a first set of documents corresponding to the first set of document identifiers;
perform a second stage processing of the query, including:
generating a second set of relevancy scores for the documents in the first set of documents based on one or more of: the list of token positions, distances between query terms in the documents, attributes of tokens in the documents, and a context in which a query term is used in a document of the first set of documents, and
selecting a subset of the first set of documents based on the second set of relevancy scores;
automatically generate one or more new query expansion terms based on documents in the subset of the first set of documents; and
generate a new query expression based on the query and the one or more new query expansion terms for processing by at least the first processing stage to produce at least a second set of document identifiers corresponding to a second set of documents.

8. The computer readable storage medium of claim 7, further comprising instructions to:
reconstruct one or more portions of the first set of documents using the list of token positions.

9. The computer readable storage medium of claim 8, further comprising instructions to:
present presenting the reconstructed portions to a user with an ordered list of documents selected from the first and second sets of documents based at least in part on the second set of relevancy scores.

10. The computer readable storage medium of claim 7, further comprising instructions to:
adjust the first set of relevancy scores for the documents in the first set of documents based on one or more of: the list of token positions, attributes of tokens in the documents, and a context in which a query term is used in a document of the documents to generate the second set of relevancy scores.

11. The computer readable storage medium of claim 7, further comprising instructions for use during the second stage processing of the query, comprising:
generate snippets for one or more documents in the subset of the first set of documents; and
automatically generate one or more new query expansion terms based on the snippets.

12. The computer readable storage medium of claim 7, wherein the token positions in the list of token positions are positions in a document repository having a range of token positions, wherein documents in the repository have distinct non-overlapping sub-ranges of token positions within the document repository's range of token positions.

13. A multi-stage query processing system, comprising:
one or more processors;
memory; and
one or more programs stored in the memory, the one or more programs comprising instructions to:
perform first stage processing of the query, including:
retrieving from an index, a list of token positions for one or more query terms in the query, wherein the token positions in the list specify positions of individual tokens that match the query terms;
based on the list of token positions, producing a first set of document identifiers, and
generating a first set of relevancy scores for a first set of documents corresponding to the first set of document identifiers;
perform a second stage processing of the query, including:
generating a second set of relevancy scores for the documents in the first set of documents based on one or more of: the list of token positions, distances between query terms in the documents, attributes of tokens in the documents, and a context in which a query term is used in a document of the first set of documents, and
selecting a subset of the first set of documents based on the second set of relevancy scores;
automatically generate one or more new query expansion terms based on documents in the subset of the first set of documents; and
generate a new query expression based on the query and the one or more new query expansion terms for processing by at least the first processing stage to produce at least a second set of document identifiers corresponding to a second set of documents.

14. The system of claim 13, further comprising instructions to:
reconstruct one or more portions of the first set of documents using the list of token positions.

15. The system of claim 14, further comprising instructions to:
present presenting the reconstructed portions to a user with an ordered list of documents selected from the first and second sets of documents based at least in part on the second set of relevancy scores.

16. The system of claim 13, further comprising instructions to:
adjust the first set of relevancy scores for the documents in the first set of documents based on one or more of: the list of token positions, attributes of tokens in the documents, and a context in which a query term is used in a document of the documents to generate the second set of relevancy scores.

17. The system of claim 13, further comprising:
instructions for use during the second stage processing of the query, comprising:
generate snippets for one or more documents in the subset of the first set of documents; and
automatically generate one or more new query expansion terms based on the snippets.

18. The system of claim 13, wherein the token positions in the list of token positions are positions in a document repository having a range of token positions, wherein documents in the repository have distinct non-overlapping sub-ranges of token positions within the document repository's range of token positions.

* * * * *

UNITED STATES PATENT AND TRADEMARK OFFICE
CERTIFICATE OF CORRECTION

| | | |
|---|---|---|
| PATENT NO. | : 8,407,239 B2 | Page 1 of 1 |
| APPLICATION NO. | : 10/917746 | |
| DATED | : March 26, 2013 | |
| INVENTOR(S) | : Dean et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2037 days.

Signed and Sealed this
Thirtieth Day of December, 2014

Michelle K. Lee
*Deputy Director of the United States Patent and Trademark Office*